Feb. 23, 1932. T. E. MURRAY, JR 1,846,567
MANUFACTURE OF VEHICLE FRAMES
Original Filed May 17, 1923
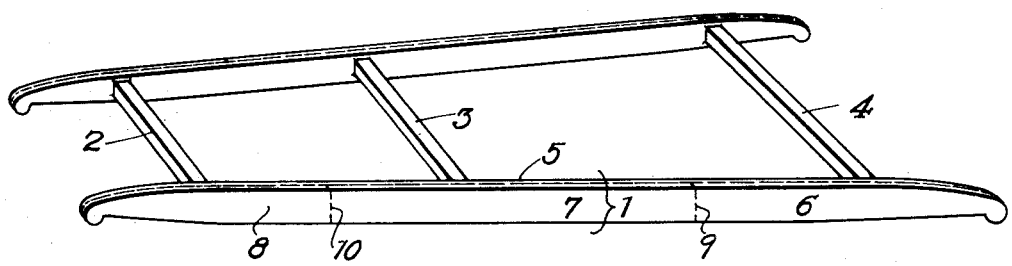
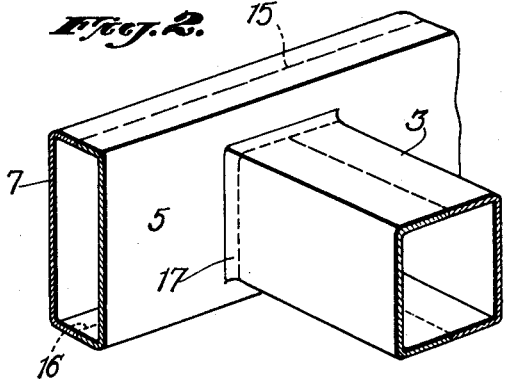 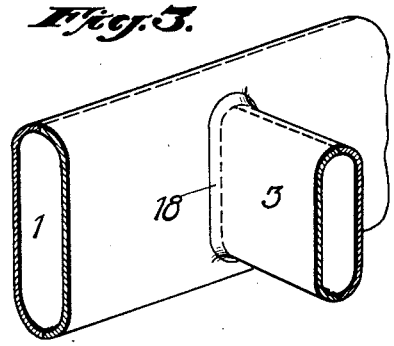
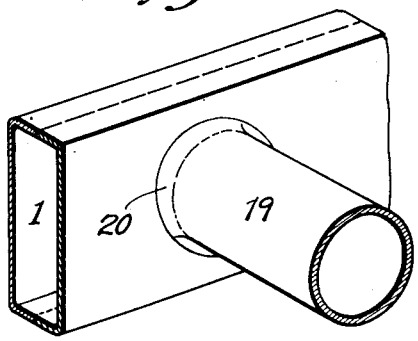 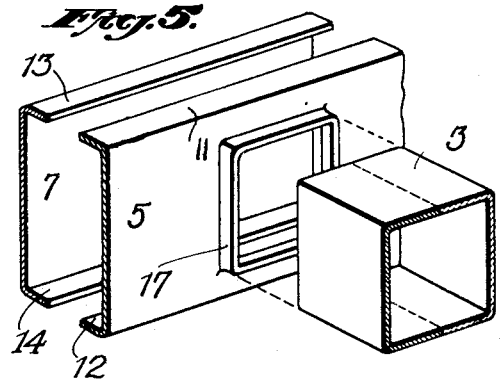
Inventor
*Thomas E. Murray Jr.*
By Attorneys Patented Feb. 23, 1932

1,846,567

UNITED STATES PATENT OFFICE

THOMAS E. MURRAY, JR., OF BROOKLYN, NEW YORK, ASSIGNOR TO METROPOLITAN ENGINEERING COMPANY, A CORPORATION OF NEW YORK

MANUFACTURE OF VEHICLE FRAMES

Original application filed May 17, 1923, Serial No. 639,631. Divided and this application filed March 18, 1929. Serial No. 347,774.

The invention aims to provide certain improvements in the manufacture of frames for automobiles and similar vehicles whereby they can be made economically and have certain advantages in use referred to hereinafter.

The present application is a division of my application No. 639,631, filed May 17, 1923.

The accompanying drawings illustrate embodiments of the invention.

Fig. 1 is a perspective view of a frame;

Fig. 2 is a detail of Fig. 1;

Figs. 3 and 4 are similar views of modifications;

Fig. 5 is a similar view of the parts of Fig. 2 before uniting them.

The frame comprises a pair of longitudinal members indicated as a whole by the numeral 1, united at intervals by transverse braces 2, 3 and 4, the ends of which are butt-welded to appropriate points of the longitudinal or side members. The shapes of the parts may be varied considerably according to the designs of the cars for which they are intended or the choice of the designer.

The side members 1 are made of sheet metal segments bent to provide flanges at the top and bottom and welded together at the edges of said flanges to form closed hollow shapes. Each side member may be continuous from end to end, that is, without transverse joints. Or it may be made of short sections with transverse joints at intervals. Or one segment may be continuous from end to end and the other made with transverse joints at intervals. For example, in Fig. 1 each side member is made of a continuous inner segment 5 to which are applied outer segments in sections 6, 7 and 8 with transverse joints 9 and 10 at their meeting ends.

Fig. 5 shows two segments 5 and 7 each provided with top and bottom flanges 11 and 12 and 13 and 14 respectively. These are butt welded together at their edges to form longitudinal joints 15 and 16 at the top and bottom. They are preferably united by resistance welding, pressing the edges together while passing across the joint a welding current of high amperage or density for a short interval of time as described, for example, in Murray Reissue Patent No. 15,466 of October 10, 1922. But they may be united by any other usual or suitable methods of welding.

The cross braces also are of hollow shapes closed in cross-section. In Figs. 2 and 5 the brace 3 is, like the side members, made of approximately rectangular shape with rounded corners and formed of two segments pressed up from sheet metal with inturned flanges at the top and bottom which are welded together at their edges by the Murray or similar method of resistance welding.

The segment 5 of the side member is made with an opening surrounded by a rib or lateral projection 17 shaped to fit the end of the brace 3. The parts are united by welding the end of the brace to the edge of the projection 17. Preferably here also butt welding resistance methods are used. The punching out of the rib 17 not only facilitates the making of a good joint, but also opens communication between the spaces within the side members and the braces and provides a reservoir which may be used for gasoline or oil. All or any number of the cross braces may be assembled in communication with the side members for such purposes.

The cross-sections of the side members and of the braces may be varied. Fig. 3 shows the side members and also the braces made with straight vertical sides and rounded top and bottom. These shapes may be made of segments stamped from sheet metal, the same as the shapes of Figs. 1, 2 and 5. The braces are welded to projecting ribs or flanges 18 similar to those shown at 17 in Figs. 2 and 5.

Fig. 4 illustrates the side member 1 made of substantially the same shape as in Fig. 1. The cross brace 19, however, is of seamless drawn tubing of circular cross-section. Its ends are butt-welded to a flange or projection 20 punched out of the side members. The shapes of the braces in Figs. 2 and 3 may be also made of seamless drawn tubing bent to the cross-section desired. While the cross-sectional shape of the side members may be varied, it is advantageous to have it of greater height than width so as to better resist the strains of use which are chiefly vertical. It is advisable also to have the inner face 5 (Fig. 5) flat and to have the edge of the projecting flange 17 in a plane at right angles to the length of the brace so as to facilitate the making of a strong joint.

Various other modifications may be made by those skilled in the art without departing from the invention as defined in the following claims.

1. A frame for automobiles and similar vehicles having hollow side members, said members being constructed of sheet metal segments bent to provide flanges at the top and bottom and welded together at their edges to form a closed cross-section, one of said segments being continuously integral from end to end and the other being in a plurality of sections joined by transverse welded joints.

2. A frame for automobiles and similar vehicles having hollow side members and transverse braces between them, each of said side members being constructed of sheet metal segments bent to provide flanges at the top and bottom and welded together at the edges of said flanges to form a closed cross-section, the segments forming the inner sides of said members having flat vertical exposed faces and having lateral projections from said flat faces which projections are identical in shape and size with the ends of the braces, the ends of said projections being butt welded to the ends of the braces.

3. A frame for automobiles and similar vehicles having hollow longitudinal members with flat vertical sides and rounded tops and bottoms, said members constructed of sheet metal bent up into a hollow section and welded together at its edges, in combination with transverse braces of a height not greater than that of the flat vertical sides of the longitudinal members, the ends of the transverse braces being welded to said flat vertical sides of the longitudinal members.

4. A frame for automobiles and similar vehicles having hollow longitudinal members with flat vertical sides and rounded tops and bottoms, said members constructed of sheet metal bent up into a hollow section and welded together at its edges, in combination with transverse braces of a height not greater than that of the flat vertical sides of the longitudinal members, the ends of the transverse braces being welded to said flat vertical sides of the longitudinal members, said transverse braces also having flat vertical sides and rounded tops and bottoms.

In witness whereof, I have hereunto signed my name.

THOMAS E. MURRAY, JR.